April 24, 1962  A. L. MOZINA ET AL  3,031,604
ELECTRIC DRIVE SYSTEM
Filed June 2, 1958
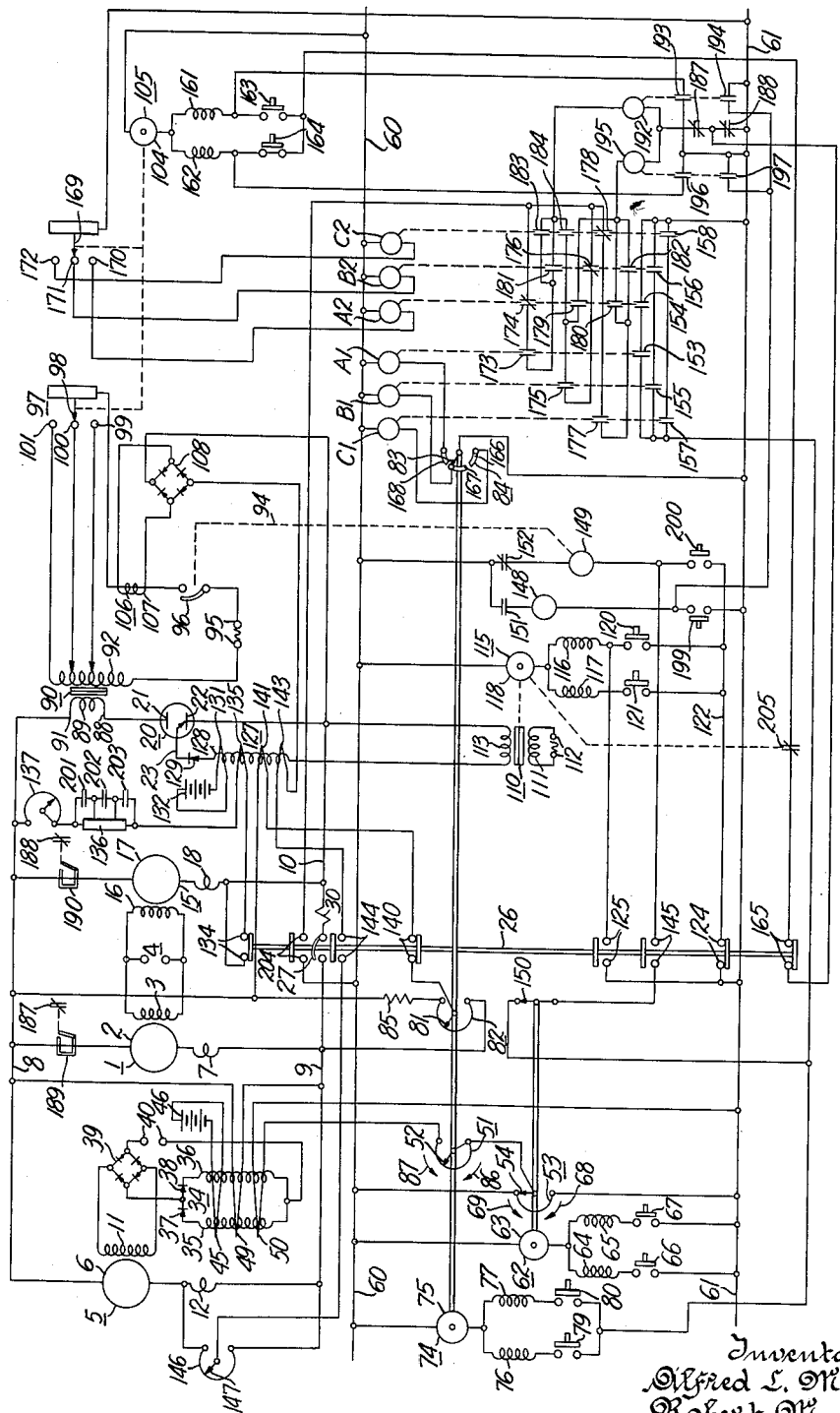
Inventors
Alfred L. Mozina
Robert M. Peeples
by Carl W. Laumann Jr.
Attorney

United States Patent Office 3,031,604
Patented Apr. 24, 1962

3,031,604
ELECTRIC DRIVE SYSTEM
Alfred L. Mozina, Minneapolis, Minn., and Robert M. Peeples, West Allis, Wis., assignors to Allis-Chalmers Manufacturing Company, Milwaukee, Wis.
Filed June 2, 1958, Ser. No. 739,105
6 Claims. (Cl. 318—152)

This invention relates generally to electric drives utilizing direct current motors and in particular to that type of variable speed drive in which a generator and a rectifier supply motors on a common bus.

The vapor type rectifier is a well known source of variable voltage direct current. The range of output voltage which may be obtained for a given input voltage is limited by the irregularities which accompany extreme deviations from a normal output voltage. To avoid damaging the rectifier or disrupting the system to which it is connected, it has been the practice to vary the input voltage to the rectifier by means of taps on the supply transformer. When the output voltage of the rectifier approaches the marginal region, a tap change is made which brings the input voltage in line with the required output voltage.

Load tap changing transformers are expensive and must be rated for the maximum current of the rectifier although a tap change may seldom be required while maximum current is being drawn. The infrequent use of maximum capacity produces a system which is more expensive than the average conditions require.

Intermittent loading of the drive such as is present in a steel rolling mill offers the opportunity for tap changing when the load is within the capacity of the tap changing mechanism. In the embodiment of our invention which is described herein, the tap changer is rated for no load, but the invention would also be applicable to a tap changer capable of operating under load conditions. By making tap changes when the load is at a minimum, a considerable saving in cost is accomplished without sacrificing performance of the system. A control circuit determines when a tap change is necessary and a load sensing circuit then determines when the required change should be made. In addition to the reduced cost of the system an increase or decrease in the system output is made automatically without the necessity for operation of additional control devices by the operator. Since the rectifier is always operated close to the optimum point, improved operation results from the standpoint of efficiency, power factor and the reduced chance of backfire.

It is therefore an object of this invention to provide an improved electric drive which incorporates a generator and a rectifier to supply a common motor.

Another object of this invention is to provide a control system for a tap changer which permits the use of a no load tap changer to supply an intermittent load.

Still another object of this invention is to provide an improved system of driving a common motor from the combined outputs of a generator and rectifier.

Other objects and advantages of this invention will become apparent from the following description taken in connection with the accompanying drawings, wherein is set forth by way of illustration and example one embodiment of this invention.

Motor 1 has a field winding 3, supplied from a source of direct current 4, and an armature winding 2 and interpole winding 7 connected to be energized by the voltage across bus 8 and bus 9. The generator 5 has an armature winding 6 connected to bus 8 and bus 9, a separately excited field winding 11 and an interpole winding 12. A second motor 15 has a separately excited field winding 16, an armature winding 17 and an interpole winding 18. Motor 15 is arranged and connected between bus 8 and bus 10 to be excited by the direct current output of rectifier 20. The rectifier 20 has an anode 21, a cathode 22 and a control electrode 23.

A circuit breaker 26 having contacts 27 is arranged to connect the armature windings 2 and 17 of motors 1 and 15 in parallel relationship so that each is in parallel with both the generator output and the rectifier output. An overload winding 30 is arranged to trip the circuit breaker 26 and disconnect the circuit associated with motor 1 from the circuit associated with motor 15 in the event of a current overload. A magnetic amplifier 34 having reactance windings 35 and 36 energized from alternating current source 40 controls an alternating current through rectifiers 37 and 38 to the bridge rectifier 39. The direct current output of bridge rectifier 39 energizes the field winding 11 of generator 5. The alternating current source 40 provides a power source for the reactance windings of magnetic amplifier 34.

A bias winding 45 energized from a source of direct current such as battery 46 is arranged to desaturate the magnetic core of the reactance windings 35 and 36 and thereby decrease the output of the magnetic amplifier 34. A control winding 49 being energized by a measure of the direct current output voltage of the generator 5 serves to decrease the current through reactance windings 35 and 36 by desaturating the core. In other words, when the generator voltage increases, the current flowing through the control winding 49 tends to decrease the field excitation of generator 5 thereby restoring the generator output voltage to the previous level. A reference winding 50 is connected so that the current flowing in this winding increases the saturation of the core thereby increasing the current through reactance windings 35 and 36 to increase the field excitation of generator 5 and raise the generator output voltage. Reference winding 50 is energized by the voltage appearing across the portion of potentiometer 53 included by tap 54. Rheostat 51 having tap 52 is in series with reference winding 50. The potentiometer 53 is energized by the direct voltage between bus 60 and bus 61. This bus serves as a fixed source of direct current. The movable tap 54 on potentiometer 53 is driven by a reversible motor 62 having an armature winding 63 and field windings 64 and 65. The motor is connected across the direct current buses 60 and 61 by means of pushbutton 66 or 67. Depressing pushbutton 66 energizes the motor through field winding 64 causing rotation in a direction to move tap 54 in the direction of arrow 68. Depressing pushbutton 67 energizes the motor through field winding 65 causing the motor to move tap 54 on potentiometer 53 in the direction of arrow 69.

Rheostat 51 adjusts the level of excitation of winding 50 from the voltage between bus 61 and tap 54 of potentiometer 53. The movable tap 52 is driven by means of motor 74 having an armature winding 75 and field windings 76 and 77. Also driven by motor 74 is the movable tap 81 on potentiometer 82 and the movable contact 83 of selector switch 84. The motor may be connected to revolve in direction of arrow 86 by means of pushbutton 79 connected to field winding 76. Rotation in the direction of arrow 87 is accomplished by connecting field winding 77 through pushbutton 80. It will be recognized that when the sliding tap 54 on potentiometer 53 is at the side closest to bus 60 and the sliding tap 52 on rheostat 51 is at the position of minimum resistance the maximum voltage will appear across reference winding 50 and maximum generator output will be obtained.

The vapor type rectifier 20 has an anode 21 connected to one end 88 of a secondary winding 89 on transformer 90. The other end 91 of transformer winding 89 is connected to bus 8. The cathode 22 of rectifier 20 is connected to bus 10. The primary winding 92 of transformer 90 is energized from an alternating current source connected to terminals 95. Connection of the alternating current source to the winding 92 is made through circuit breaker contacts 96 and contacts 98 and 100 of the tap changing mechanism 97 operated by a reversible motor 105. Additional contacts 99 and 101 of tap changing mechanism 97 provide a means for varying the turns ratio between the primary and secondary windings. A current transformer 106 in circuit with the primary winding 92 of transformer 90 provides means for deriving a signal voltage responsive to the magnitude of the alternating current flowing in the primary windings 92. The secondary winding 107 of the current transformer is connected to the alternating current terminals of the bridge rectifier 108. The direct current output of rectifier 108 is, therefore proportional to the alternating current in the primary winding 92. This allows an accurate measurement of the output current of the rectifier 20, since the output of the rectifier is proportional to the input from winding 89.

The voltage on the control element 23 of rectifier 20 is varied by means of a phase shifting device 110 driven by motor 115. Phase shifting device 110 has a primary winding 111 energized by an alternating current source 112 and a secondary winding 113. The phase of the voltage across the secondary winding 113 may be varied by means of motor 115 having a split field winding 116 and 117 and an armature winding 118. The phase of the voltage on the control element 23 may be varied to raise the output voltage of the rectifier by means of pushbutton 120 which connects the field winding 116 and the armature winding 118 of motor 115 between the direct current bus 60 and conductor 122 to rotate phase shifter 110 in the proper direction. The phase of the voltage on the control element 23 may be varied to lower the output voltage of the rectifier by means of pushbutton 121 which connects field winding 117 and armature winding 118 of motor 115 across the direct current bus 60 and conductor 122 to rotate the phase shifter. It will be observed that the condition illustrated is that where motor 1 is driven exclusively from the output of the generator 5 and motor 15 is driven exclusively from the output of the rectifier 20. This is the condition when the circuit breaker contacts 27 are open. In the event that the circuit breaker is open as illustrated in the accompanying drawing, connection of the phase shift motor 115 across the direct current bus 60 and bus 61 can be made only by means of the pushbuttons 120 and 121 which operate to connect the motor to bus 61 through contacts 124 and conductor 122. When the circuit breaker 26 is closed, a connection is made by means of contacts 125 on circuit breaker 26 so that the field winding 116 is connected to drive the phase shifter to the point where maximum output is obtained from the rectifier.

From this it will be obvious that the phase shift motor may be operated to control the rectifier only during the condition of split bus operation, that is to say, when the circuit breaker contacts 27 are open. The phase shift device provides means for controlling the output voltage of the rectifier.

When the circuit breaker 26 is closed and contacts 125 have closed to energize motor 115 and run the phase shifter 110 to the maximum output condition, the reactive phase shift means 127 serves to vary the phase of the voltage on the control electrode 23. A phase shift winding 128 is connected between phase shifter 110 and the control electrode 23. A rectifier 129 in series with this circuit blocks the reverse flow of current in the circuit energizing the control electrode 23.

A bias winding 131 on the same core as phase shift winding 128 provides a source of magnetomotive force in the core which shifts the control electrode voltage in the direction to decrease the output of the rectifier 20. During split bus operation, that is, with circuit breaker contacts 27 open, it will be observed that contacts 134 on the circuit breaker 26 complete the connection of control winding 135 across the motor 15, in series with calibrating resistor 136 and rheostat 137. Winding 135 is so polarized that increasing the current flowing through the winding causes a phase shift of the voltage on control electrode 23 which decreases the output of rectifier 20. The purpose of contacts 201, 202 and 203 will be explained later. It is sufficient to say at this time that they are responsive to relays A2, B2 and C2 to recalibrate current through the control winding 135 for the various positions of the tap changing mechanism.

Additional contact 140 on the circuit breaker 26 completes the connection of the reference winding 141 on the reactive phase shifter 127 so that winding 141 is energized by a measure of the generator output voltage appearing across the tapped portion of potentiometer 82 and resistor 85. This winding is energized by a constant current as the generator voltage is increased by the rheostat 51 but allows the reactive phase shifter 127 to modify the rectifier voltage in response to actuations in the generator voltage caused by load changes. Winding 141 is so polarized that an increase in the output voltage of generator 5 causes a phase shift of the voltage on the control electrode 23 to effect an increase in the rectifier output voltage. The movable arm 81 on the potentiometer 82 enables a constant voltage to be picked off and therefore allows motor 15 to be run at a predetermined speed relative to the speed of motor 1. The adjustment of the rectifier voltage to vary the speed of motor 15 is obtained by means of rheostat 137. Increasing the resistance raises the rectifier voltage.

For the regulation of the rectifier 20 during the time the circuit breaker contact 27 is closed and rectifier 20 and generator 5 combine their outputs to drive motors 1 and 15 it will be observed that the control winding 135 for the reactive phase shift means is disconnected through contacts 134. Similarly, the reference winding 141 is disconnected through contacts 140, leaving only the bias winding 128 connected of the windings that were formerly used to regulate the output of rectifier 20.

Closure of the circuit breaker 26 closes contacts 144 to connect winding 143 to be responsive to the relative output currents of generator 5 and rectifier 20. With the generator and rectifier outputs in parallel, winding 143 is the only control winding used on reactive phase shifter 127. The load balance winding 143 is connected to be energized by the difference in the output voltage of bridge rectifier 108 and the voltage across the tapped portion of potentiometer 146. This potentiometer is energized by the voltage drop across the generator interpole winding 12. The circuit completed by contacts 144 extends from bus 9 through the portion of potentiometer 146 picked off by the variable tap 147, through contacts 144, on the circuit breaker 26, through the load balance winding 143 to the negative terminal of the bridge rectifier 108 and from the positive terminal of rectifier bridge 108 back to the bus 9 through bus 10 and contacts 27.

When the motors are operating on a common bus and contacts 27 are closed, an interlock switch 150 on the same shaft as the potentiometer 53 prevents closure of the rectifier circuit breaker 94 until the generator voltage has reached a predetermined minimum value. The circuit breaker 94 may be closed when the tap 54 on the potentiometer 53 has reached the maximum clockwise position. In this position, the interlock switch 150 and contacts 145 on circuit breaker 26 are closed to actuate the closing coil 149 of circuit breaker 94 when contacts 153 and 154, or 155 and 156, or 157 and 158 are closed. This completes a circuit from bus 60 through normally closed contacts 152 of circuit breaker 94 through the closing coil 149 of circuit breaker 94, contacts 145 and 150 and any one of the three combinations of contacts 153 and 154, 155 and 156 or 157 and 158 to bus 61.

When the generator voltage reaches the predetermined minimum point, the interlock switch 150 is closed and closing coil 149 of rectifier breaker 94 is energized to close contacts 96. This completes the circuit to the primary of transformer 90 so that direct current flows from the rectifier to the motors connected to the bus 8 and buses 9 and 10.

The operation of the tap changing system is somewhat more complex. It will be seen that the selector switch 84 for the tap changer 97 is on the shaft common to rheostat 51 and potentiometer 82. This means that the tap selected will be determined by the setting of the vernier control for generator voltage driven by motor 74. Tap changing motor 105 has armature winding 104 and two field windings 161 and 162 which operate the tap changing mechanism to raise the voltage across winding 89 or lower it in response to either the raise pushbutton 163 or the lower pushbutton 164. It will be observed that the point common to pushbuttons 163 and 164 is connected to the bus 61 by means of a contact 165 on circuit breaker 26. Contact 165 is closed only during the time that the circuit breaker is open. This prevents manual operation of the tap changer unless the circuit breaker is open so that the rectifier cannot supply power to motor 1. This avoids the chance of changing taps manually when the two motors are on a common bus and the tap changer is under automatic control responsive to the generator voltage.

When the circuit breaker 26 is closed, operation of the tap changer is controlled by the selector switch 84 which is driven by motor 74. Since motor 74 also drives rheostat 51, the generator voltage control, the operation of the tap changer will follow the generator voltage.

When the selector switch 84 for the tap changer is positioned so that the movable contact 83 engages the fixed segment 166, a circuit through relay coil C1 is completed from bus 60 to bus 61. This relay picks up and closes contacts 177 and 157. If the tap changing mechanism 97 is on tap 100, the movable contact 169 will be in engagement with contact 171. Contacts 170 and 172 correspond to taps 99 and 101, respectively, on the primary of the rectifier transformer 90. When the movable contact 169 is in engagement with contact 171, relay coil B2 is energized and opens contact 176 while closing contacts 156, 181 and 182. A circuit is then completed from bus 61 through normally closed contacts 187 and 188, operated by overload relays 189 and 190 in the circuit with motors 1 and 15, respectively, through the coil 195 of the lower relay to bus 60 through contacts 182, 177 and 178.

Energizing coil 195 of the lower relay closes contacts 196 and 197. This completes one circuit from bus 60 through the armature winding 104 and field winding 162 of motor 105 to bus 61 through contact 196. At the same time contact 197 completes a circuit from bus 61 through the trip coil 148 for circuit breaker 94, to bus 60 through contact 151 on circuit breaker 94. This opens the circuit breaker 94 and allows the tap changing operation to proceed under no load conditions.

When the tap changer motor 105 has driven the movable contacts 98 and 169 into the position where they engage contacts 101 and 172, respectively, the relay coil C2 is energized so that contacts 158, 183 and 184 close and contact 178 reopens. Opening contact 178 deenergizes relay 195 which in turn breaks the circuit leading to motor 105 to stop movement of the tap changer 97. Relay B2 drops out after a time delay and closes contact 176 and opens contacts 156, 181 and 182.

Since contact 157 was closed by relay C1, closing contact 158 on relay C2 completes a circuit to energize the closing coil 149 for the circuit breaker 94. This energizing circuit runs from bus 61 through contacts 158, 157, 150 and 145 through the closing coil 149 and contacts 152 to bus 60.

The circuit breaker 94 then closes contacts 96 to re-energize primary winding 92 of transformer 90 so that rectifier 20 again produces a direct current output.

To trace through another cycle of the tap changer would be repetitious but certain features of the operation are deserving of mention.

The contacts 153, 154, 155, 156 and 157 and 158 are so connected that when the selector switch 84 is on the segment calling for tap A, closure of the circuit breaker 94 can be effected only when the tap changer is on tap A, provided of course, that the system is being run on a common bus and contacts 27 are closed. This feature prevents the tap changing transformer 90 from delivering an improper voltage to the rectifier 20. The contacts 150 on the master voltage control potentiometer shaft are closed only when this potentiometer has been run to its limit and therefore assures that the rectifier will not be energized until a predetermined minimum generator voltage has been reached. To bring the rectifier into the circuit at too low a voltage would cause the rectifier to operate inefficiently and therefore eliminate one of the reasons for its inclusion, which is to improve efficiency of the drive.

Contacts 187 and 188, operated by the load relays 189 and 190 in circuit with motors 1 and 15, respectively, prevent the lower relay 195 or raise relay 192 from closing at a time when load current is above a predetermined minimum value. Since relays 192 and 195 cannot be energized with either contact 187 or 188 open, contact 196 on relay 195 and contact 193 on relay 192 will remain open to prevent operation of the tap changer motor 105 when a predetermined minimum current flows in either motor circuit.

Protection of the tap changer is provided by contact 194 on relay 192 and contact 197 on relay 195. Closure of either of these contacts will cause the circuit breaker 94 to open by energizing the trip coil 148. Thus, operation of the tap changer is always preceded by the opening of circuit breaker 94.

The additional contacts 173 through 184 on relays A1, B1, C1, A2, B2 and C2 serve as a form of logic circuit which tells the tap changer motor 105 which way and how far to run to make the position of the tap changer 97 coincide with the position of the selector switch 84.

For example, the combination of contacts 173 and 174, or 175 and 176, or 177 and 178 serves to stop the tap changer when it reaches the proper position. The contacts 179 and 180, 181 and 182, together with contacts 183 and 184 complete the logic circuit. While this description includes only three tap positions, it is obvious to one skilled in the art that the circuit could be easily expanded to include more tap positions.

The push button 199 is an emergency means for opening circuit breaker 94 and provides means for deenergizing the rectifier when in normal, split bus operation. Pushbutton 200 allows the circuit breaker to be closed manually when the circuit breaker 26 is open and motors 1 and 15 are on their individual buses 9 and 10, respectively.

With circuit breaker 26 open so that motor 1 is fed exclusively from the output of generator 5 and motor 15 is fed exclusively from the output of rectifier 20, the operator would depress pushbutton 66 to begin operation of the system. This causes motor 62 to rotate the master voltage control in a direction which increases the amount of current flowing in the reference winding 50 thereby increasing the generator output voltage. When the motor 62 has reached the limit of its travel, the master voltage, control 53 is at the limit of its movement and generator 5 will be operating at a predetermined minimum voltage. Since the circuit breaker 26 is open, contacts 151 are also open and the switch 150 also operated by motor 62 has no effect.

When the maximum voltage which may be obtained from operation of motor 62 is reached, any further increase in the generator output voltage must be obtained through operation of the vernier voltage control. By depressing pushbutton 79, the operator can energize motor 74 to further increase the current flowing in the reference winding 50 by means of rheostat 51. When motor 74 has reached the limit of its travel and the full voltage between bus 60 and bus 61 appears across the reference winding 50, the maximum generator output voltage has been obtained. In other words, the output of the magnetic amplifier 34 is at its maximum point and the full field current is flowing in field 11 to develop the maximum output voltage in generator 5. Associated with magnetic amplifier 34 is a control winding 49. This control winding is energized by the output voltage of the generator 5 and is so polarized that an increase in output voltage tends to decrease the output of the magnetic amplifier. Decreasing the output of the magnetic amplifier reduces the field current of the generator and therefore also the generator output voltage.

Energization of the rectifier 20 may be effected by depressing pushbutton 200 which is in circuit with the closing coil 149 of circuit breaker 94. Closing circuit breaker 94 closes contacts 96 which are in the primary circuit of transformer 90. When contacts 96 are closed, a complete circuit is made including the alternating current source 95 and the primary winding 92 of transformer 90. The output of the rectifier 20 will be determined by the voltage applied to the rectifier from transformer 90 and also by the phase of the voltage on the control electrode 23. The voltage applied to the rectifier 20 is a function of the position of the selector switch 84 which is on the same shaft as the vernier voltage control 51 operated by motor 74. Thus, the voltage applied to the rectifier 20 will be a function of the setting of the vernier voltage control.

Further modification of the voltage output of the rectifier may be achieved by means of motor driven phase shift means 110. A motor 115 may be operated by means of pushbutton 120 or pushbutton 121 to increase or decrease the output of the rectifier through a phase shifting of the control voltage applied to electrode 23. To increase the direct current output of the rectifier 20, the operator will depress pushbutton 120 which connects motor 115 to shift the phase of the control voltage applied to control electrode 23 in a manner so that the output voltage of the rectifier is increased. The reactive phase shifter 127 effects a further phase shifting of the control voltage to maintain the output of the rectifier at the desired level. Control winding 135, energized by the direct current output of the rectifier, shifts the phase of the control voltage in a manner so that the output remains constant. For example, should the output voltage of the rectifier decrease, the decreased current flowing in the control winding 135 would shift the phase of the control voltage in a manner so that the output voltage of the rectifier is raised. Since the output voltage is a function of the voltage applied to the rectifier it is necessary to compensate in the control winding circuit for the various applied voltages. This is done by the contacts 201, 202 and 203 associated with relays A2, B2 and C2, respectively. These contacts are connected to calibrating resistor 136 and automatically increase or decrease the current through the control winding 135 to compensate for the difference in applied voltage to the rectifier as the position of the tap changer is varied.

The reactive phase shifter also has a reference winding 141 energized by a measure of the output voltage of generator 5. This voltage is picked off potentiometer 82 by tap 81 which is on the same shaft as the vernier voltage control operated by motor 74. The reference winding on the reactive phase shifter allows the motor 15 to follow variations in the speed setting of motor 1.

It will be observed that the tap changes are made automatically and follow the position of the voltage vernier control so that any time the rectifier is energized and the motors are on a common bus, the tap changer will be in proper voltage range relative to the operating point of generator 5.

Operation of the tap changer while the motors are operating on separate buses may be accomplished by means of push-button 163 which connects motor 105 to raise the output voltage of transformer 90 or pushbutton 164 which connects motor 105 to lower the output voltage of transformer 90. When circuit breaker 26 is opened, contacts 204, in series with relays 192 and 195, are also opened to prevent automatic operation of the tap changer. However, a circuit must be made for the manual operation of pushbuttons 163 and 164 through contact 205 which is closed when the phase shifter is at the position for minimum rectifier voltage. This means that the motor 15 will be operating at very low speed to prevent damage due to the sudden voltage change.

Thus, the operator has complete idependent control of the output of rectifier 20. He may start from the very lowest tap with the extreme phase shift of the voltage on electrode 23 to produce a low direct current output. The tap changer position and the phase of control voltage on electrode 23 may be varied at will. Thus, the basic speed of motor 15 and the speed of motor 1 are independent of each other.

Operation with both motors fed in common by the output of generator 5 and rectifier 20 is somewhat different from the split bus operation. To begin operation of the motor 1 and motor 15 on a common bus the operator first closes circuit breaker 26 by any suitable means, not shown on the drawing. At this point there is no output from rectifier 20 or generator 5. Circuit breaker 94 is open to prevent energization of transformer 90 and rectifier 20. It should be noted that this operation begins with the tap changing mechanism on tap 101, which is the tap for the lowest output voltage.

The operator begins to raise the generator voltage by depressing pushbutton 66 which causes motor 62 to drive the master voltage control in the direction of arrow 68. The tap 54 on potentiometer 53 picks off a greater and greater portion of the voltage appearing across bus 60 and bus 61. This voltage causes a current to flow in reference winding 50 which increases the output of magnetic amplifier 34. The output of magnetic amplifier 34 in turn energizes field winding 11 of generator 5 to increase the voltage output of the generator.

The operator continues to hold pushbutton 66 closed until motor 62 has reached the limit of its travel. At this point the variable tap 54 on potentiometer 53 is picking off the entire voltage between bus 60 and bus 61. When the maximum position of potentiometer 53 has been reached, contacts 150 on the same shaft as potentiometer 53 are closed. The energization circuit is thus completed for closing coil 149 of circuit breaker 94.

When circuit breaker 26 closed, it operated to run the phase shift motor 115 to the extreme high position by closing contact 125 to complete a circuit through motor 115 which included field winding 116. This insures that the rectifier 20 will be operating at the point of minimum phase shift for the maximum output which is the most efficient point.

Thus, at a predetermined minimum voltage both the rectifier and the generator deliver output to motor 1 and motor 15. Control of the rectifier is effected through the reactive phase shifter 127. It will be observed that the control winding 135 is made inoperative since contacts 134 are open. Also, the reference winding 141 is made inoperative by the opening of contact 140. Control of the rectifier is effected by a load balance winding 143. This winding sees the difference between a first signal proportional to the output of the rectifier and a second signal proportional to the output of the generator. The difference between these two signals determines the output of the rectifier. In this manner, a load sharing is achieved between the rectifier and the generator.

Further increase in the voltage may be had by depressing pushbutton 79 which operates the venier voltage control motor 74. Depressing the pushbutton 79 operates to cause the motor to rotate in direction 86. Rotating the motor in direction 86 causes the variable tap 52 of rheostat 51 to increase the current to the reference winding 50. This increases the generator output voltage. While the generator output voltage is increasing the load balance winding current is also increasing the rectifier output voltage which causes the rectifier to maintain its proper share of the load current.

Continued rotation of motor 74 causes a shift in the selector switch from position 166 to position 167. As the selector arm 83 moves from position 166 to position 167, it causes relay C1 to drop out and relay B1 to pick up. When relay C1 drops out, contact 157 is opened to stop further operation of motor 74 even though pushbutton 80 is held down. This causes the generator voltage and rectifier voltage to remain constant until the tap changing operation is complete. Relay C2 will remain energized until the tap change is made. When relay B1 picks up, a complete circuit is made from bus 60 through contacts 204, 176, 175 and 184 to the raise relay coil 192. Energizing the raise relay coil causes contacts 194 to pick up which trips circuit breaker 94 and also closes contacts 193 which operate the tap changer motor 105 in a direction to move the tap changing mechanism from tap 101 to tap 100.

When the tap changing motor has run to the tap 100, contact 169 makes an electrical connection with contact 171, causing relay B2 to pick up and deenergize raise relay 192 by opening contact 176. When the raise relay coil 192 becomes deenergized contacts 193 and 194 again open stopping operation of the tap changing motor and permitting circuit breaker 94 to be closed. A2, B2 and C2 are time delay dropout relays to prevent the tap changer from stopping between taps.

A circuit is then completed between bus 61 and bus 60 through the closing coil 149 of circuit breaker 94 through contacts 156, 155, 150, 145 and 152. Closing contact 96 again connects the alternating current source 95 to the primary winding 92 of transformer 90. With contacts 155 and 156 closed, the operator may again raise the voltage by means of pushbutton 79. During the time the tap changing mechanism was in operation, the circuit controlling motor 74 was disconnected by means of the contacts 153 through 158 on relays A1, B1 and C1. The operator may continue to raise the voltage until the selector 83 disengages segment 167 and picks up segment 168. This calls for another tap change and the tap changing operation is repeated. It will be observed the generator carries the load for the period of time that the tap changer is in operation, the rectifier being entirely disconnected from the power source during tap changing operation.

Thus, this system provides means for operating both motors from the output of the generator and the rectifier connected in parallel, or motor 1 may be operated solely from the output of generator 5 and motor 15 solely from the output of rectifier 20. This offers the advantages of rectifier operation while losing none of the advantages of generator mode of operation. Since the rectifier is always operated at close to the optimum point from the standpoint of efficiency, reliability and avoidance of backfire, the reliability of the system is greatly increased.

Although but a single embodiment of the invention has been shown and described, it will be apparent to one skilled in the art that various changes and modifications may be made therein without departing from the spirit of the invention or from the scope of the appended claims.

What is claimed is:

1. In an electric drive, a motor, a generator having a field winding and an armature winding, generator control means electrically associated with said field winding for controlling the output of said generator, a rectifier having an input circuit and an output circuit, rectifier control means for varying the output of said rectifier over a predetermined range, a transformer having a primary winding and a secondary winding, means connecting said primary winding to a source of power, means connecting said secondary winding to said rectifier input circuit, tap changing means on said transformer for varying the turns ratio between said primary and secondary windings in steps that correspond to the range of variation of said rectifier output, means connecting said motor to said armature winding and said rectifier output circuit, means for connecting said armature winding and said rectifier output circuit in parallel, control means for said tap changing means responsive to said generator control means whereby said rectifier output corresponds within said range to said generator output, current sensing means in circuit with said motor, interlock means responsive to said current sensing means in circuit with said tap changer control means for preventing the operation of said tap changing means when the current in said motor exceeds a predetermined value.

2. In an electric drive, a motor, a generator having a field winding and an armature winding, generator control means electrically associated with said field winding for controlling the output of said generator, a rectifier having an input circuit and an output circuit, rectifier control means for varying the output of said rectifier over a predetermined range, a transformer having a primary winding and a secondary winding, means connecting said primary winding to a source of power, means connecting said secondary winding to said rectifier input circuit, tap changing means on said transformer for varying the turns ratio between said primary and secondary windings in steps that correspond to the range of said rectifier output, means connecting said motor to said armature winding and said rectifier output circuit, means for connecting said armature winding and said rectifier output circuit in parallel, control means for said tap changing means responsive to said generator control means to actuate said tap changing means at a plurality of predetermined positions of said voltage control means, said predetermined positions being selected to minimize the rectifier output variation due to said rectifier control means, whereby the efficiency and reliability of said rectifier are increased, current sensing means in circuit with said motor interlock means responsive to said current sensing means in circuit with said tap changer control means for preventing the operation of said tap changing means when the current in said motor exceeds a predetermined value.

3. In an electric drive, a generator having a field winding and an armature winding, generator control means electrically associated with said field winding for controlling the output of said generator, a rectifier having an input circuit and an output circuit, a motor comprising an electrical load, means connecting said load to the armature winding of said generator and the output circuit of said rectifier, means for connecting said armature winding and said rectifier output circuit in parallel, current sensing means in circuit with said generator for producing a first signal responsive to the output current of said generator, means for producing a second signal responsive to the direct current output of said rectifier, control means electrically associated with said rectifier for controlling the output of said rectifier over a predetermined range, in response to the relative magnitudes of said first and second signals, a transformer having primary and secondary windings, means connecting said secondary windings to said rectifier input circuit, tap changing means on said transformer for varying the turns ratio between said primary and secondary windings, control means for said tap changing means responsive to said generator control means whereby said rectifier corresponds within said range to said generator output, current sensing means in circuit with said load, interlock means responsive to said current sensing means in circuit with said tap changer control means for preventing the operation of said tap changing means when the current in said load exceeds a predetermined value.

4. In an electric drive, a generator having a field winding and an armature winding, generator control means electrically associated with said field winding for controlling the output of said generator, a rectifier having a control element, an input circuit and an output circuit, a motor comprising an electrical load, means connecting said load to the armature winding of said generator and the output circuit of said rectifier, means for connecting said armature winding and said rectifier output circuit in parallel, current sensing means in circuit with said generator for producing a first signal responsive to the output current of said generator, means for producing a second signal responsive to the direct current output of said rectifier, means electrically associated with said control element and connected to be energized by said first and second signals whereby the output of said rectifier is regulated over a predetermined range in response to the relative magnitudes of said first and second signals, a transformer having primary and secondary windings, means connecting said secondary windings to said rectifier input circuit, tap changing means on said transformer for varying the turns ratio between said primary and secondary windings in steps that correspond to the range of said rectifier, control means for said tap changing means responsive to said generator control means whereby the range of said rectifier corresponds to said generator output, current sensing means in circuit with said load, interlock means responsive to said current sensing means in circuit with said tap changer control means whereby the operation of said tap changing means is prevented when the current in said load exceeds a predetermined value.

5. In an electric drive, a motor, a generator having a field winding and an armature winding, a vapor type rectifier having an anode, a cathode, and a control electrode, means connecting said motor to said generator armature winding and to said rectifier anode and cathode, means for connecting said anode and said cathode of said rectifier and said armature winding in parallel, a transformer having a primary winding and a secondary winding, means connecting said primary winding to a source of power, means connecting said secondary winding in circuit with said rectifier and said motor, speed setting means, excitation means for said generator field, means connecting said excitation means to be responsive to said speed setting means, tap changing means on said transformer for varying the turns ratio between said primary and secondary windings, control means for said tap changing means, means connecting said control means to be responsive to said speed setting means, current sensing means in circuit with said primary winding for deriving a first signal voltage responsive to the output current of said rectifier, means for deriving a second signal voltage responsive to the output current of said generator, means for applying a control voltage to said control electrode, phase shift means for varying the phase of said control voltage relative to the voltage across said secondary winding, means connecting said phase shift means to be responsive to the relative magnitude of said first and second signal voltage whereby the load current is divided between said generator and rectifier, load current sensing means in circuit with said motor, interlock means responsive to said load current sensing means for preventing the operation of said tap changing means.

6. In an electric drive, a motor, a generator having a field winding and an armature winding, a vapor type rectifier having an anode, a cathode, and a control electrode, means connecting said motor to said generator armature winding and to said rectifier anode and cathode, means for connecting said anode and said cathode of said rectifier and said armature winding in parallel, a transformer having a primary winding and a secondary winding, means connecting said primary winding to a source of power, means connecting said secondary winding in circuit with said rectifier and said motor, speed setting means, excitation means for said generator field, means connecting said excitation means to be responsive to said speed setting means, circuit breaker means in circuit with said transformer for connecting said rectifier to a source of power, means responsive to said speed setting means for closing said circuit breaker at a predetermined generator voltage, tap changing means on said transformer for varying the turns ratio between said primary and secondary windings, control means for said tap changing means, means connecting said control means to be responsive to said speed setting means, current sensing means in circuit with said primary winding for deriving a first signal voltage responsive to the output current of said rectifier, means for deriving a second signal voltage responsive to the output current of said generator, means for applying a control voltage to said control electrode, phase shift means for varying the phase of said control voltage relative to the voltage across said secondary winding, means connecting said phase shift means to be responsive to the relative magnitude of said first and second signal voltage whereby the load current is divided between said generator and rectifier, load current sensing means in circuit with said motor, interlock means responsive to said load current sensing means for preventing the operation of said tap changing means.

References Cited in the file of this patent

UNITED STATES PATENTS

| 2,030,099 | Dawson | Feb. 11, 1936 |
| 2,333,616 | Michael | Nov. 2, 1943 |

FOREIGN PATENTS

| 444,883 | Great Britain | Mar. 24, 1936 |